United States Patent [19]

Kempter et al.

[11] 4,444,942

[45] Apr. 24, 1984

[54] BATH COMPOSITION FOR CATAPHORETIC ELECTROCOATING

[75] Inventors: Fritz E. Kempter, Mannheim; Eberhard Schupp, Schwetzingen; Günther Sabelus, Lambsheim, all of Fed. Rep. of Germany

[73] Assignee: BASF Aktiengesellschaft, Fed. Rep. of Germany

[21] Appl. No.: 388,515

[22] Filed: Jun. 15, 1982

[30] Foreign Application Priority Data

Jun. 19, 1981 [DE] Fed. Rep. of Germany ....... 3124088

[51] Int. Cl.$^3$ ............................................. C08G 14/06
[52] U.S. Cl. ................................ 524/596; 204/181.C;
525/490; 525/494; 528/149; 528/150; 528/159;
528/162
[58] Field of Search ......................................... 524/596

[56] References Cited

U.S. PATENT DOCUMENTS

| | | | |
|---|---|---|---|
| 3,935,087 | 1/1976 | Jeraber et al. | 204/181 |
| 3,994,989 | 11/1976 | Kempter et al. | 260/831 |
| 4,001,155 | 1/1977 | Kempter et al. | 260/29.2 EP |
| 4,147,676 | 4/1979 | Pampouchidis | 260/23 TN |
| 4,179,425 | 12/1979 | Panpouchidis et al. | 260/29.6 N R |
| 4,336,116 | 6/1982 | Schupp et al. | 204/159.11 |
| 4,340,455 | 7/1982 | Kempter et al. | 204/181 C |
| 4,340,714 | 7/1982 | Schupp et al. | 528/99 |
| 4,376,849 | 3/1983 | Kempter et al. | 525/490 |

FOREIGN PATENT DOCUMENTS

| | | |
|---|---|---|
| 1021493 | 11/1977 | Canada . |
| 1303480 | 1/1973 | United Kingdom . |
| 1409728 | 10/1975 | United Kingdom . |
| 1576159 | 10/1980 | United Kingdom . |

*Primary Examiner*—Stanford M. Levin
*Attorney, Agent, or Firm*—Keil & Witherspoon

[57] ABSTRACT

A bath composition for cataphoretic electrocoating of conductive surfaces contains coating agents which have been rendered soluble or dispersible with acid, contain basic nitrogen groups and carry groups of the general formulae (I) and (II)

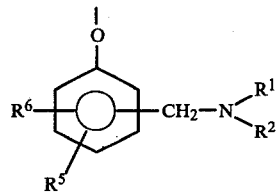

(I)

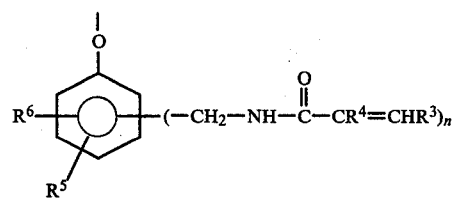

(II)

and, optionally, also groups of the general formulae (III) and/or (IV)

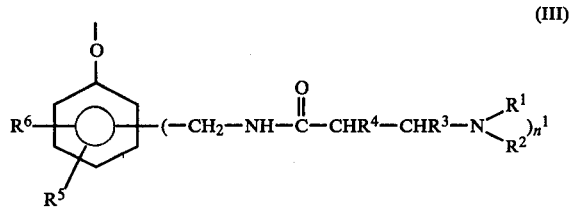

(III)

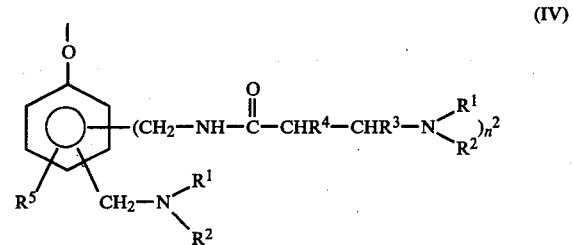

(IV)

where $R^1$ and $R^2$ are each alkyl, hydroxyalkyl or alkoxyalkyl, $R^3$ and $R^4$ are each hydrogen or methyl, $R^5$ and $R^6$ are each hydrogen, alkyl or a divalent radical of a polymer molecule which is bonded to a phenol or phenol ether, $n^1$ is 1, 2 or 3 and $n^2$ is 1 or 2, and where the oxygen bonded to the phenyl radical is either in the form of the OH group or etherified.

6 Claims, No Drawings

BATH COMPOSITION FOR CATAPHORETIC ELECTROCOATING

The present invention relates to a bath composition for cataphoretic electrocoating, containing, in addition to water and conventional assistants and additives, one or more coating agents which have been rendered soluble or dispersible with acid and contain basic nitrogen groups.

The cataphoretic electrocoating process, in which film-forming materials are deposited on a substrate under the influence of an applied electrical potential, has recently achieved great commercial importance. Modified epoxy resins containing blocked isocyanate groups, eg. as disclosed in German Pat. No. 2,252,536, German Published Application DAS No. 2,057,799 and German Pat. No. 2,363,074, and modified urethane-epoxy resins containing double bonds, eg. as disclosed in German Published Applications DAS No. 2,749,776, DAS No. 2,732,955 and DAS No. 2,755,538 and German Laid Open Application DOS No. 2,753,861, are predominantly used. Finally, binders which are classified as epoxy resin-modified Mannich bases and can be prepared, as described, for example, in German Pat. Nos. 2,320,301, 2,357,075 and 2,419,179 are employed.

Electrocoating baths containing the first two classes of binder mentioned above have the disadvantage that soluble lead salts are present, so that safe disposal of the waste is mandatory.

The aging characteristics of electrocoating baths based on Mannich bases, the crosslinking reaction of which proceeds virtually exclusively via groups of the general formula 1

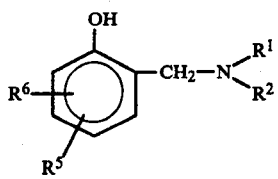

but especially via diethanolaminomethyl groups, needed to be improved further.

In addition, the conventional pretreatment with chromic acid-containing rinsing agents to achieve a high level of protection from corrosion on steel sheets treated with metal phosphates needed to be avoided as far as possible, because of the associated environmental pollution.

It is an object of the present invention to provide aqueous bath compositions for cataphoretic electrocoating which do not have the above disadvantages or are at least substantially improved in respect thereof.

We have found that this object is achieved when aqueous bath compositions which contain one or more coating agents which have been rendered soluble and/or dispersible with an acid and carry certain groupings are used for cataphoretic electrocoating.

The present invention relates to a bath composition for cataphoretic electrocoating, containing, in addition to water and conventional assistants and additives, one or more coating agents which have been rendered soluble or dispersible with acid and contain basic nitrogen groups, wherein the coating agent or agents carries or carry groups of the general formulae (I) and (II)

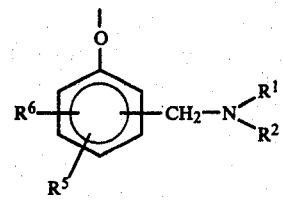

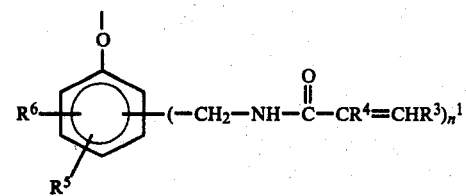

and, optionally groups of the general formulae (III) and/or (IV)

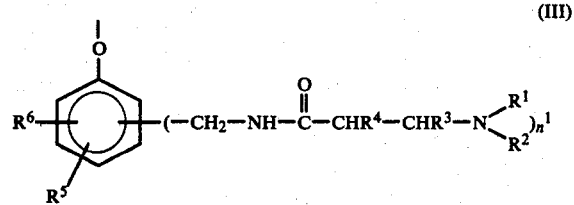

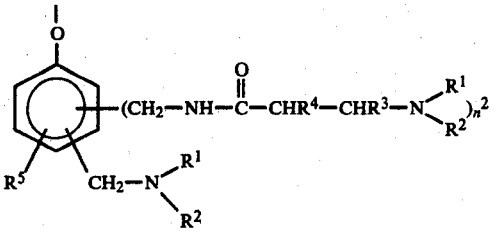

where $R^1$ and $R^2$ are identical or different and are each alkyl of 1 to 9 carbon atoms, or hydroxyalkyl or alkoxyalkyl, each of 2 to 10 carbon atoms, or are linked to one another to form a 5-membered or 6-membered ring, $R^3$ and $R^4$ are identical or different and each is hydrogen or methyl, $R^5$ and $R^6$ are identical or different and each is hydrogen, alkyl of 1 to 13 carbon atoms, alkenyl of 10 to 18 carbon atoms or a methylene, ethylene, isopropylidene or aralkylene radical of 7 to 15 carbon atoms which is bonded to a phenol or phenol ether, where these radicals can be bridged to form fused-on rings, or —O—,

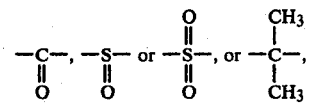

$n^1$ is 1, 2 or 3 and $n^2$ is 1 or 2, and where the oxygen bonded to the phenyl radical is a component either of a hydroxyl group or an ether group.

Particularly preferred bath compositions are those containing from 1 to 1,000 ppm of the complex-bonded copper and/or cobalt.

The present invention also relates to bath compositions which additionally contain pigments and/or fillers and/or organic solvents and/or water-insoluble or water-indispersible binders.

The following details may be noted concerning the components which make up the coating agents and the bath composition according to the invention:

The coating agents which can be present in dissolved and/or dispersed form in the baths according to the invention and which carry groups of the general formulae (1) and (11) and/or groups of the general formula (III) and, optionally, (IV), are self-crosslinking and/or extraneously crosslinking materials, ie. amino-methyl-phenol radicals can be incorporated in a resin molecule together with amido-methyl-phenol radicals, or the two radicals can occur in different molecules.

A simple method of obtaining baths having the composition according to the invention comprises combining Mannich base/epoxy resin reaction products, such as are disclosed, for example, in the above German Pat. Nos. 2,320,301, 2,357,075 and 2,419,179, with amido-methyl-phenol/epoxy resin reaction products, such as are disclosed, for example, in German patent application Nos. P 29 42 488.2, P 30 21 300.4, P 30 26 873.6 P 31 23 968.4 and P 31 24 089.5.

The above epoxy resin-modified Mannich bases generally exert a certain carrier function on the amido-methyl-phenol/epoxy resin reaction products. In extreme cases, this can mean that the amido-methyl-phenol/epoxy resin reaction products are no longer of cationic character and are virtually completely water-insoluble, or cannot be dispersed without assistants.

In another possible case, the amido-methyl-phenol/epoxy resin reaction products are combined, as carriers which can be deposited cathodically, with Mannich bases which are built up in a simple manner, eg. from bisphenol A and a secondary dialkylamine.

German patent application No. P 31 18 418.9 discloses a possible method of obtaining the self-crosslinking baths mentioned, and the coating agents or baths containing groups of the formula (II) can be prepared by reacting amido-methyl-phenols with the reaction product (V)

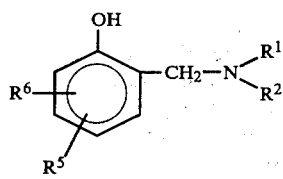

which is obtained from a secondary amine and formaldehyde in a separate step, before the reaction with epoxy groups. This measure leaves the unsaturated groups of the general formula (II) substantially intact.

For the bath composition according to the invention, it is essential that, in the case of polyhydric phenols, some or all of the groups of the general formula (I) are in the form of the phenol

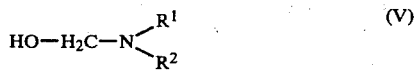

or of the phenol ether

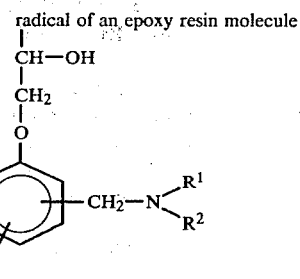

where the groups may be capable of complex formation with copper and/or cobalt ions and can undergo crosslinking reactions with the groups of the general formulae (II) and (III) after the cataphoretic coating.

As regards the components which make up the binders, German Pat. Nos. 2,320,301, 2,357,075 and 2,419,179 disclose the Mannich base/epoxy resin reaction products carrying groups of the general formula (I), German patent application Nos. P 29 42 488.2, P 30 21 300.4 and P 30 26 823.6 disclose the amidomethyl-phenol/epoxy resin reaction products carrying groups of the general formulae (II) and/or (III), German patent application Nos. P 30 26 873.6 and P 31 24 089.5 (O.Z. 0050/035214) disclose polyadducts/polycondensates carrying groups of the general formulae (I), (III) and (IV), and German patent application No. P 31 23 968.4 discloses products containing groupings of the general formulae (I) and (IV), where $R^1$ and $R^2$ in the Mannich groups are alkyl or alkoxyalkyl, and (II) and (III).

Products which have the general formula (II), but which themselves contain little or no basic nitrogen, can be obtained by, for example, reacting acrylamidomethylated phenols with epoxy compounds under catalysis by quaternary onium groups, and can be combined with, for example, polyadducts/polycondensates carrying groups of the general formula (I).

The coating agents to be used for the bath compositions according to the invention are protonated (in amounts of not more than 25% by weight) with an acid, eg. phosphoric acid or a derivative thereof, but preferably with a water-soluble carboxylic acid, eg. acetic acid, formic acid or lactic acid, and preferably employed, if appropriate in combination with other binders, eg. polybutadiene oils, as surface-coating binders for cathodic electrocoating of electrically conductive surfaces, eg. metal components, sheets and the like, made of brass, copper, aluminum, metallized plastic or material coated with conductive carbon, as well as iron and steel, which may or may not be chemically pretreated, for example phosphatized.

The coating agents to be used for the bath compositions according to the invention carry groups of the general formulae (I) and (IV) in such an amount that the bath compositions have a sufficiently high pH and adequate crosslinking takes place under the chosen baking conditions, but in each case contain not less than one of the above groups per molecule, and generally from 2 to 4 of the groups of the general formulae (I) to (IV). The distribution of the groups can be chosen as desired.

The aqueous solutions or dispersions of the bath compositions according to the invention, some or all of which are in the form of salts, may also contain as a mixture with these compositions the conventional assistants and additives which can be cataphoretically deposited, such as pigments, eg. carbon black, talc, titanium dioxide, kaolin, basic lead chromate, iron oxide pigments and the like, soluble dyes, solvents, flow improvers, stabilizers and anti-foams, as well as other assistants and additives, hardening catalysts, especially manganese or cobalt naphthenates or octoates which accelerate autoxidative hardening, and also metal salts of the prior art, as disclosed in, for example, German Laid-Open Applications DOS No. 2,541,234 and DOS No. 2,457,437, but in particular the $Cu^{++}$ or $Co^{++}$ ion, which is capable of the above complex formation with the groups of the general formula (I).

If desired, the coating agents to be used for the bath composition according to the invention may contain a certain amount of quaternary ammonium groups, which may be desirable in order to increase the pH of the resulting bath compositions.

For cathodic electrocoating, the solids content of the electrocoating bath is generally brought to from 5 to 30, preferably from 10 to 20, percent by weight by dilution with demineralized water. The deposition is in general carried out at from 15° to 40° C. for a period of from 1 to 3 minutes at a bath pH of from 5.0 to 8.5, preferably from 6.0 to 7.5, at a deposition voltage of from 50 to 500 volt. After the film which has been deposited on the electrically conductive article has been rinsed, it is hardened for from 10 to 30 minutes at from about 140° C. to 200° C., preferably for about 20 minutes at from 150° C. to 180° C.

In the Examples which follow and which illustrate the invention, without restricting it, parts and percentages are by weight, unless indicated otherwise.

(a) Preparation of a Polyphenol Containing Ether Groups 420 parts of a triglycidyl ether obtained from pentaerythritol and epichlorohydrin, and having an epoxide value of 0.62, are reacted with 73.2 parts of phenol for 30 minutes at 180° C. as described in Example 1 of German Pat. No. 2,419,179. 364.6 parts of bisphenol A are then added, the temperature of the mixture dropping to about 120° C. The mixture is heated again to 180° C. in the course of 30 minutes and is kept at this temperature for 1 hour, cooled to 130° C. and diluted with 420 parts of toluene to give a solids content of 67.8%.

(b) Preparation of a Polyphenol Containing Ether Groups 984 parts of a triglycidyl ether obtained from pentaerythritol and epichlorohydrin, and having an epoxide value of 0.62, and 111.2 parts of phenol are heated to 180° C. 923.6 parts of bisphenol A are added at this temperature, the temperature of the mixture dropping to about 120° C. The mixture is heated again to 180° C. in the course of 30 minutes and is kept at this temperature until the viscosity reaches 560 mPa.s (measured by means of an ICI plate-and-cone viscometer at 150° C.). The mixture is cooled to 130° C. and diluted with 968 parts of isobutanol to give a solids content of 68.5%.

(c) Tscherniac-Einhorn/Michael Reaction 430 parts of the polyphenol which contains ether groups and has been prepared according to (a), 136.5 parts of acrylamide, 79.7 parts of paraformaldehyde, 91 parts of p-tert.-butylphenol, 0.4 part of phenothiazine and 78 parts of bisphenol A are brought into solution at 115° C. The solution is then cooled to 60° C. and 1 part of boron trifluoride ethyl etherate is added. After reaction for 30 minutes at 60° C., a further 1 part of boron trifluoride ethyl etherate is added, followed by another 0.7 part after another 30 minutes at 60° C. The mixture is allowed to continue reacting for 3 hours at 60° C., with stirring, and water is then eliminated at 120° C. Thereafter, 202 parts of diethanolamine are added dropwise and the mixture is allowed to continue reacting for a further 2 hours at 90° C., and is then diluted with 29.4 parts of isobutanol, 29.4 parts of isopropanol, 110 parts of butyl glycol and 110 parts of ethyl glycol. The solids content is 67.3%.

(d) Tscherniac-Einhorn/Michael Reaction 357.3 parts of a phenol-containing indene resin containing 6.1% of phenolic OH groups, and 91 parts of acrylamide, 53.1 parts of paraformaldehyde, 0.2 part of phenothiazine and 62 parts of toluene are first brought into solution at 115° C. The solution is then cooled to 60° C. and 0.7 part of boron trifluoride ethyl etherate is added. After reaction for 30 minutes at 60° C., a further 0.7 part of boron trifluoride ethyl etherate is added, followed by another 0.4 part after another 30 minutes. The mixture is allowed to continue reacting for 3 hours at 60° C., with stirring, and water is then eliminated at 120° C. Thereafter, 134.6 parts of diethanolamine are added dropwise at 90° C., and the mixture is allowed to continue reacting for a further two hours at 90° C. Finally, it is diluted with 50 parts of isopropanol and 50 parts of isobutanol. The solids content is 78.2%.

(e) Preparation of a Binder Containing Acrylic Double Bonds 376 parts of phenol, 497 parts of acrylamide, 242.5 parts of paraformaldehyde and 0.1 part of Cu powder are first brought into solution at 120° C., the solution is then cooled to 60° C. and 8 parts of boron trifluoride ethyl etherate are added as a catalyst. The mixture is then allowed to react for 4 hours at 60° C. (including the exothermic reaction phase) and for 30 minutes at 100° C. The water of reaction is then substantially distilled off under reduced pressure, and the mixture is diluted to a solids content of 70% with isobutanol. 177 parts of the 70% strength binder are reacted with 25 parts of diethanolamine for 2 hours at 95° C. 123 parts of a diglycidyl ether obtained from bisphenol A and epichlorohydrin, and having an epoxide value of 0.5, 63.4 parts of isopropanol and 0.1 part of 2,6-di-tert.-butyl-p-cresol are added, and the mixture is allowed to continue reacting at 85° C. for another 14 hours. Finally, the mixture is partly neutralized with a mixture of 3 parts of acetic acid and 50 parts of completely demineralized water.

(f) Preparation of a Binder Containing Acrylic Double Bonds 376 parts of phenol, 497 parts of acrylamide, 210 parts of paraformaldehyde and 0.1 part of Cu powder are brought into solution at 120° C., the solution is cooled to 60° C. and 8 parts of boron trifluoride ethyl etherate are added as a catalyst. The mixture is then allowed to react for 4 hours at 60° C. (including the exothermic reaction phase) and for 30 minutes at 100° C. The water of reaction is then substantially distilled off under reduced pressure, and the mixture is diluted to a solids content of 70% with isobutanol. 170.8 parts of the 70% strength binder and 25 parts of diethanolamine are reacted for 2 hours at 95° C. 123 parts of a diglycidyl ether obtained from bisphenol A and epichlorohydrin, and having an epoxide value of 0.5, 63.4 parts of isopropanol and 0.1 part of 2,6-di-tert.-butyl-p-cresol are added, and the mixture is allowed to continue reacting at 85° C. for a further 16 hours. Finally, the mixture is partly neutralized with a mixture of 3 parts of acetic acid and 50 parts of completely demineralized water.

(g) Preparation of a Binder Containing Acrylic Double Bonds 376 parts of phenol, 497 parts of acrylamide, 242.5 parts of paraformaldehyde and 0.1 part of Cu powder are first brought into solution at 120° C., the solution is then cooled to 60° C. and 8 parts of boron trifluoride ethyl etherate are added as a catalyst. The mixture is then allowed to react for 4 hours at 60° C. (including the exothermic reaction phase) and for 30 minutes at 100° C. The water of reaction is then substantially distilled off under reduced pressure, and the mixture is diluted to a solids content of 70% with isobutanol.

177 parts of the 70% strength binder and 13 parts of diethanolamine are reacted for 2 hours at 95° C. 123 parts of a diglycidyl ether obtained from bisphenol A and epichlorohydrin, and having an epoxide value of 0.5, and 11.5 parts of isobutanol are added, and the mixture is allowed to continue reacting at 95° C. for another 6 hours. It is then diluted to a solids content of 70% with isobutanol. Preparation of the electrocoating binder

EXAMPLE A 252.6 parts of the Tscherniac-Einhorn/Michael adduct prepared according to (c), 125 parts of bisphenol A, 33.5 parts of paraformaldehyde, 37.3 parts of diethanolamine, 40 parts of dibutylamine, 50 parts of di-n-hexylamine and 60 parts of isobutanol are stirred for 15 minutes at 50° C. and then for 2.5 hours at 80° C. 137.3 parts of a diglycidyl ether obtained from bis-phenol A and epichlorohydrin, and having an epoxide value of 0.2, 54.7 parts of a triglycidyl ether and 50 parts of isobutanol are then added. The mixture is allowed to continue reacting at 70° C. until the viscosity reaches 1,350 mPa.s (measured by means of an ICI plate-and-cone viscometer from Epprecht at 75° C.), and is then diluted with 50 parts of isobutanol. The solids content is 73.3%.

EXAMPLE B 252.6 parts of the Tscherniac-Einhorn/Michael adduct prepared according to (c), 33.5 parts of paraformaldehyde, 125 parts of bisphenol A, 86.4 parts of di-n-butylamine, 50 parts of di-n-hexylamine and 29 parts of isobutanol are stirred for 15 minutes at 50° C. and then for 2.5 hours at 80° C. 137.3 parts of a diglycidyl ether obtained from bisphenol A and epichlorohydrin, and having an epoxide value of 0.2, 54.7 parts of a triglycidyl ether obtained from pentaerythritol and epichlorohydrin, and having an epoxide value of 0.62, and 50 parts of isobutanol are then added. The mixture is allowed to continue reacting at 70° C. until the viscosity reaches 740 mPa.s (measured by means of an ICI plate-and-cone viscometer at 75° C.), and is then diluted with 50 parts of isobutanol. The solids content is 74.2%.

EXAMPLE C 268.5 parts of the Tscherniac-Einhorn/Michael adduct obtained according to (d), 82.5 parts of bisphenol A, 26.7 parts of paraformaldehyde, 95.6 parts of di-n-butylamine, 70 parts of isopropanol and 35 parts of isodecanol are stirred for 15 minutes at 50° C. and then for 2.5 hours at 80° C. 142 parts of a diglycidyl ether obtained from bisphenol A and epichlorohydrin, and having an epoxide value of 0.1, and 47 parts of toluene are then added. After a further 30 minutes at 75°–80° C., 103 parts of a diglycidyl ether obtained from bis-phenol A and epichlorohydrin, and having an epoxide value of 0.2, 56 parts of a triglycidyl ether obtained from pentaerythritol and epichlorohydrin, and having an epoxide value of 0.62, 24 parts of isopropanol and 50 parts of ethyl glycol are added. The mixture is allowed to continue reacting at 70° C. until the viscosity reaches 440 mPa.s (measured by means of an ICI plate-and-cone viscometer at 75° C.). The reaction is interrupted by addition of 7 parts of mercaptoethanol. The solids content is 69.5%.

EXAMPLE D 79 parts of the polyphenol prepared under (b), 125 parts of bisphenol A, 78.3 parts of diethanolamine, 40 parts of dibutylamine, 50 parts of dihexylamine, 43.7 parts of paraformaldehyde and 83.3 parts of isobutanol are stirred for 15 minutes at 50° C. and for 2.5 hours at 80° C. in the manner described in Example 1 of German Pat. No. 2,419,179, but without the acetylenediurea tetra-methoxybutyl ether. 137.3 parts of a diglycidyl ether obtained from bisphenol A and epichlorohydrin, and having an epoxide value of 0.2, 54.7 parts of a triglycidyl ether obtained from pentaerythritol and epichlorohydrin, and having an epoxide value of 0.62, and 50 parts of isobutanol are added, and the reaction is continued for 5 hours at 70° C. The viscosity reaches 1,360 mPa.s (measured by means of an ICI plate-and-cone viscometer at 75° C.). The mixture is then diluted with 50 parts of isobutanol. The solids content is 67.1%. Electrocoating

EXAMPLE 1

To prepare a 10% strength coating bath, 70 parts of the solid resin obtained according to Example A, 30 parts of the solid resin prepared according to (e), 1 part of Co-Soligen ® (Co content of 8%) from Hoechst AG and 120 ppm of $Cu^{++}$ (based on bath volume) as an aqueous copper acetate solution are mixed thoroughly, protonation is effected with 1.25% of acetic acid, based on solid resin, and the mixture is made up to 1,000 parts with fully demineralized water. The coating bath is then stirred for 48 hours at 30° C., and has a pH of 7.0 and a conductivity of 1,066 $\mu S/cm^{-1}$. After the stirring, 5 parts of isodecanol are added. On phosphatized steel sheets connected as the cathode, deposition for 2 minutes at 110 volt and 30° C., and hardening for 20 minutes at 180° C., give a 14–16 μm thick coating. A coating of the same thickness is obtained on non-pretreated steel sheets after deposition for 2 minutes at 70 volt and 30° C. and hardening for 20 minutes at 180° C. The DIN 50,021 corrosion test, carried out for 10 days, gave a penetration of from 0.3 to 0.9 mm on zinc-phosphatized water rinsed steel sheets (eg. Bonder ®125 W fro.. Metallgesellschaft AG), and a penetration of from 3 to 4 mm on non-pretreated steel sheets, the penetrations being measured from the cut.

EXAMPLE 2

80 parts of the solid resin obtained according to Example B, 20 parts of the solid resin prepared according to (d), 80 ppm of $Cu^{++}$ (based on bath volume) as an aqueous copper acetate solution and 25 ppm of $Co^{++}$ (based on bath volume) as an aqueous cobalt nitrate solution are mixed thoroughly, protonation is effected with 20% of acetic acid, based on solid resin, and the mixture is made up to 1,000 parts with fully demineralized water. The coating bath is then stirred for 48 hours at 30° C., and has a pH of 6.1 and a conductivity of 1,225 $\mu$S.cm$^{-1}$. After the stirring, 1 part of isodecanol is added. On phosphatized steel sheets, deposition for 2 minutes at 175, volt and 30° C., and hardening for 20 minutes at 180° C., give a 15-17 $\mu$m thick coating.

The DIN 50,021 corrosion test carried out for 10 days, gave a penetration of from 0.5 to 1.5 mm on zinc-phosphatized water-rinsed steel sheets, and a penetration of from 0.2 to 0.8 mm on iron-phosphatized water rinsed steel sheets (eg. Bonder ®1041 W), the penetrations being measured from the cut.

EXAMPLE 3

80 parts of the solid resin obtained according to Example C, 20 parts of the solid resin prepared according to (d), 5 parts of Alfol ®1214/4 (from Condea), 80 ppm of Cu$^{++}$ (based on bath volume) as an aqueous copper acetate solution and 25 ppm of Co$^{++}$ (based on bath volume) as an aqueous cobalt nitrate solution are mixed thoroughly, protonation is effected with 2% of acetic acid (based on solid resin) and the mixture is made up to 1,000 parts with fully demineralized water. The coating bath is then stirred for 48 hours at 30° C., and has a pH of 6.15 and a conductivity of 1,236 $\mu$S.cm$^{-1}$. On phosphatized steel sheets, deposition for 2 minutes at 120 volt and 30° C. and hardening for 20 minutes at 180° C. give a 15-17 $\mu$m thick coating. On non pre-treated steel sheets, deposition for 2 minutes at 85 volt and 30° C. and hardening for 20 minutes at 180° C. give a 14-16 $\mu$m thick coating. The DIN 50,021 corrosion test, carried out for 10 days, gave a penetration of from 0.5 to 1.1 mm on zinc-phosphatized water-rinsed steel sheets, and a penetration of from 2.7 to 6.5 mm on iron-phosphatized water-rinsed steel sheets, the penetrations being measured from the cut.

EXAMPLE 4

To prepare a 10% strength coating bath, 50 parts of the solid resin obtained according to Example D, 50 parts of the solid resin prepared according to (f), 5 parts of butyl glycol and 120 ppm of Cu$^{++}$ (based on bath volume) as an aqueous copper acetate solution are mixed thoroughly, protonation is effected with 0.5% of acetic acid (based on solid resin) and the mixture is made up to 1,000 parts with fully demineralized water. The coating bath is then stirred for 48 hours at 30° C., and has a pH of 7.05 and a conductivity of 1,090 $\mu$S.cm$^{-1}$. After the stirring, 15 parts of isodecanol are added. On phosphatized steel sheets, deposition for 2 minutes at 110 volt and 30° C. and hardening for 20 minutes at 180° C. give a 14-16 $\mu$m thick coating. On non-pretreated steel sheets, deposition for 2 minutes at 35 volt and 30° C. and hardening for 20 minutes at 180° C. give a 15-16 $\mu$m thick coating. The DIN 50,021 corrosion test carried out for 10 days, gave a penetration of from 0.7 to 1.4 mm on zinc-phosphatized water-rinsed steel sheets, a penetration of from 1 to 2.5 mm on iron-phosphatized water-rinsed steel sheets and a penetration of from 1.6 to 2.5 mm on non-pretreated steel sheets, the penetrations being measured from the cut.

EXAMPLE 5

60 parts of the solid resin obtained according to Example D, 40 parts of the solid resin prepared according to (g), 5 parts of butyl glycol and 120 ppm of Cu$^{++}$ (based on bath volume) as an aqueous copper acetate solution are mixed thoroughly, protonation is effected with 1% of acetic acid (based on solid resin) and the mixture is made up to 1,000 parts with fully demineralized water. The coating bath is then stirred for 48 hours at 30° C., and has a pH of 7.2 and a conductivity of 957 $\mu$S.cm$^{-1}$. After stirring, 7.5 parts of isodecanol are added. On phosphatized steel sheets, deposition for 2 minutes at 130 volt and 30° C. and hardening for 20 minutes at 180° C. give a 14-16 $\mu$m thick coating. On non-pretreated steel sheets, deposition for 2 minutes at 40 volt and 30° C. and hardening for 20 minutes at 180° C. give a 14-15 $\mu$m thick coating.

The DIN 50,021 corrosion test carried out for 10 days gave a penetration of from 0.5 to 1 mm on zinc-phosphatized water-rinsed steel sheets, a penetration of from 0.5 to 1.2 mm on iron-phosphatized water-rinsed steel sheets and a penetration of from 1 to 3.5 mm on non-pretreated steel sheets, the penetrations being measured from the cut.

We claim:

1. A bath composition for cataphoretic electrocoating, containing, in addition to water and conventional assistants and additives, one or more coating agents which have been rendered soluble or dispersible with acid and contain basic nitrogen groups, wherein the coating agent or agents carries or carry groups of the formulae (I) and (II)

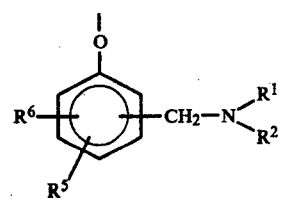

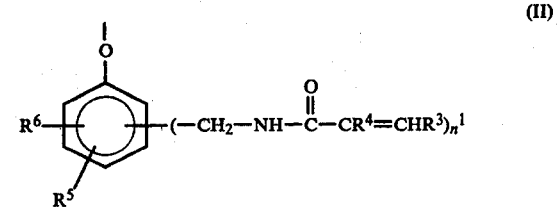

and optionally, groups of the formulae (III) or (IV)

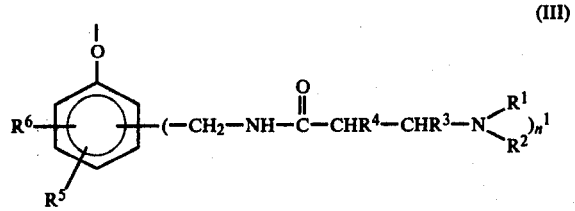

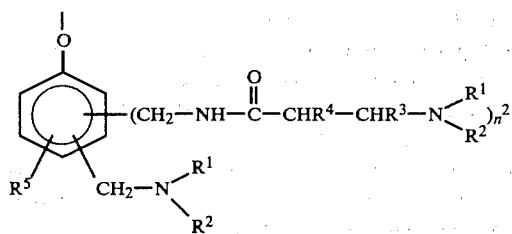

where $R^1$ and $R^2$ are identical or different and are each alkyl of 1 to 9 carbon atoms, or hydroxyalkyl or alkoxyalkyl, each of 2 to 10 carbon atoms, $R^3$ and $R^4$ are identical or different and each is hydrogen or methyl, $R^5$ and $R^6$ are identical or different and each is hydrogen, alkyl of 1 to 13 carbon atoms, alkenyl of 10 to 18 carbon atoms or a methylene, ethylene, isopropylidene or aralkylene radical of 7 to 15 carbon atoms which is bonded to a phenol or phenol ether, where these radicals are bridged to form fused-on rings, or —O—,

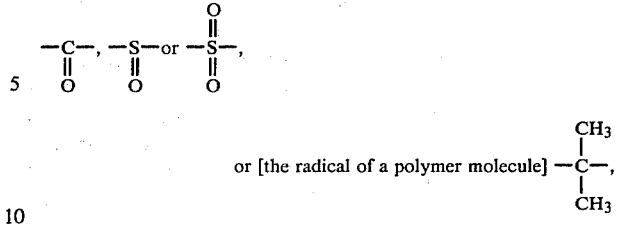

$n^1$ is 1, 2 or 3 and $n^2$ is 1 or 2, and where the oxygen bonded to the phenyl radical is a component either of a hydroxyl group or of an ether group.

2. A bath composition as claimed in claim 1, which contains from 1 to 1,000 ppm of complex-bonded copper or cobalt or copper and cobalt.

3. A bath composition as claimed in claim 1, wherein the aqueous solution or aqueous dispersion contains pigments, fillers or organic solvents, or mixtures of these substances.

4. A bath composition as claimed in claim 1, wherein the aqueous solution or dispersion additionally contains water-insoluble or water-indispersible binders.

5. A bath composition as claimed in claim 2, wherein the aqueous solution or dispersion additionally contains water-insoluble or water-indispersible binders.

6. A bath composition as claimed in claim 3, wherein the aqueous solution or dispersion additionally contains water-insoluble or water-indispersible binders.

* * * * *